Oct. 6, 1959    C. R. KRONOFF    2,907,352
HARNESS MECHANISM FOR LOOM
Filed June 4, 1957
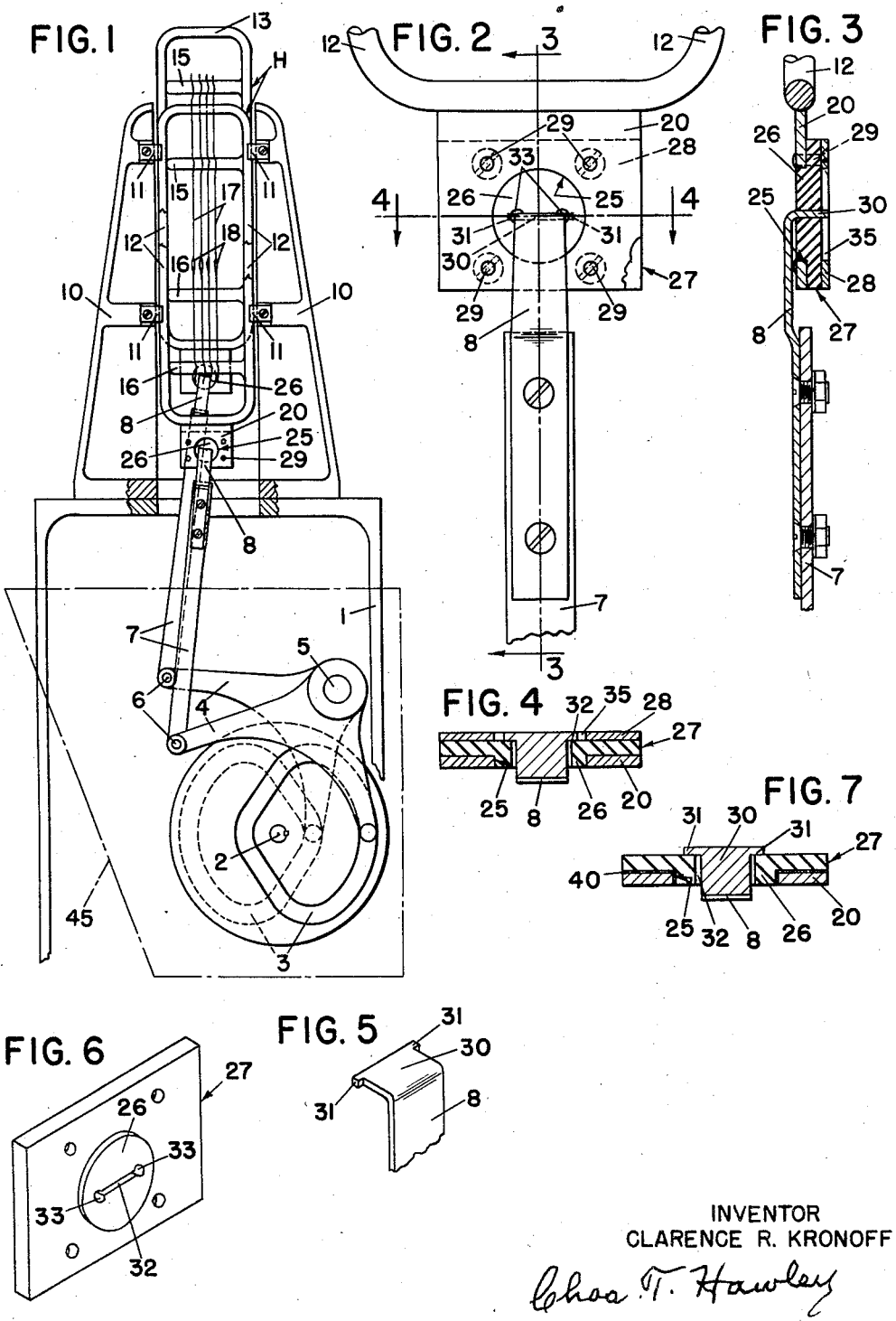
INVENTOR
CLARENCE R. KRONOFF
Chas T. Hawley
ATTORNEY

United States Patent Office 2,907,352
Patented Oct. 6, 1959

2,907,352

HARNESS MECHANISM FOR LOOM

Clarence R. Kronoff, Worcester, Mass., assignor to Crompton & Knowles Corporation, Worcester, Mass., a corporation of Massachusetts Application June 4, 1957, Serial No. 663,511

10 Claims. (Cl. 139—58)

This invention relates to improvements in harness mechanisms for looms and it is the general object of the invention to provide operative connections between a harness frame and its driver made in such manner as to obviate the need for lubrication.

The harness frames for high speed narrow ware needle looms are ordinarily driven by a cam mechanism employing a lever and a connector or driver which connects the lever to the bottom rail of the harness frame. In many looms of this type the distance between the connection between the driver and a harness frame which is up is only a few inches from the warp shed of a harness frame which may be in down position. As heretofore made the connection between the driver and the harness frame has usually included a metal to metal drive requiring lubrication and because of the close proximity of the driver to the warp threads and especially because of the high speed of the loom, there is danger that the lubricant will spatter or be thrown sufficiently to discolor the warp.

It is an important object of the present invention to overcome this objection by providing an operative connection between the frame and its driver including a body of soft elastic rubber or rubbery like material secured to the frame and having connection with the driver. Such a connection does not require lubrication and has the added advantage of serving as a shock absorber which is desirable due particularly to the high speed at which such looms operate.

The usual connection between the driver and the harness frame is likely to employ a round stud or its equivalent and in such a connection the maximum thrust of the driver against the frame occurs only at the top of the stud and diminishes to zero as the stud curves down from its top to its sides. It is a further object of the present invention to provide operative connections so constructed that the thrust or force of the driver can be distributed over a comparatively large area which is substantially at right angles to the direction in which the harness frame is reciprocated.

When a pivoted lever is utilized to operate the driver the latter usually hase some angular motion with respect to the harness frame in addition to the up and down motion which reciprocates the frame. This angular motion is one reason why it has been necessary in the past to lubricate the joint between the driver and the harness frame. It is a further object of the present invention to provide a form of driving connection which will permit angular motion of the driver in a direction more or less parallel to the plane of the harness frame without requiring lubrication. This result is accomplished by the present invention by the aforesaid body of elastic material which can yield to accommodate angular motion of the driver.

It is a still further object of the invention to provide the aforesaid bottom rail of the harness frame with an opening through which the head of the driver can pass for attachment to the body of elastic material. The latter is secured to the bottom rail but those parts of it which are exposed by the opening in the rail are not directly connected to the latter and are therefore capable of yielding to torsional stress to accommodate the angular motion already mentioned without disturbing the connection with the rail.

In order that the invention may be clearly understood reference is made to the accompanying drawing which illustrates by way of example the two embodiments of the invention and in which:

Fig. 1 is a rear elevation, parts in section, of a loom having the invention applied thereto, Fig. 2 is an enlarged rear elevation of parts of a harness frame and its driver and the operative connections between them, Figs. 3 and 4 are vertical and horizontal sections respectively on lines 3—3 and 4—4, Fig. 2, Fig. 5 is a detail perspective of the head on the upper end of the driver, Fig. 6 is a perspective view of the soft elastic body of material forming an important part of the invention, and Fig. 7 is a view similar to Fig. 4 but showing a modified form of the invention.

Referring to Fig. 1, the loom has a frame 1 in which is rotatably mounted a shaft 2 to which are secured cams 3 for operating harness levers 4. The latter are pivoted on a fixed stud 5 supported by the frame and are pivoted at 6 to upwardly extending connectors 7. The upper end of each connector is bolted to a driver member 8 for attachment in a manner to be described to a harness frame.

The frame of the loom also supports uprights 10 which are provided with guides 11 for the harness frames designated generally at H. Each harness frame has opposite parallel vertical sides 12 and a top 13, the sides 12 fitting into corresponding guides 11. Each frame H has top and bottom heddle bars 15 and 16 respectively on which are mounted heddles 17 having eyes 18 for warp threads. Each harness frame H is provided with a light weight bottom cross rail 20 which may be made of some light but sufficiently strong metal, such as aluminum. While a detailed form of harness frame has been shown, such as shown in Patent No. 2,483,857, the invention is not necessarily limited to all of the details already described.

In carrying the invention into effect the bottom rail is provided with a circular opening 25 into which extends a preferably close fitting projection 26 formed integrally with a body of soft elastic material, such as rubber, designated generally at 27. In the preferred form a metal plate 28 having the same general contour as the body 27 fits over the latter and is secured to the bottom rail as by screws 29 which pass through the body and are screw-threaded into the rail and are then headed off by a riveting operation so that the plate 28 and the body of rubber are firmly fixed to the rail 20.

The driver member 8 has a laterally bent head 30 formed with oppositely extending ears 31. The body of rubber is provided with a horizontal slot 32 which ends preferably in holes 33 extending through the body. The over-all distance from end to end of the ears 31 is greater than the length of the slot plus the holes 33.

When assembling the parts the rubber body will have its projection 26 inserted through the opening 25 and the screws 29 will then be attached to the rail as already described. One of the ears 31 is then inserted into one of the openings 33 after which the head will be pressed to one side so that the other ear can enter the other hole 33. This can be done readily because of the inherent elasticity of the rubber body. When thus assembled ears project beyond the slot in the rubber and hold the head so that it cannot slip out of the rubber body. The plate 28 is of sufficient thickness to serve as a guard to prevent the ears from striking the adjacent harness frame. To provide room for the ears and end of the head the plate 28 is provided with an opening 35 preferably aligned with the opening 25 in the bottom rail. The lower end of the member 8 can then be attached to the connector 7 and the parts will be ready for operation.

There are usually several harness frames and if for any reason it should be necessary to change a member 8 the corresponding harness frame can be moved to low position and the other harness frames lifted to provide a space required for manipulating the member 8 when it is being disconnected from the rubber body and also provide space for attaching a new member 8 to the harness frame, should that be necessary.

In another form of the invention the plate 28 may be omitted and a rubber to metal bond cement relied upon to secure the body of rubber to the bottom rail. In this case the body of rubber will be substantially the same as that already described and it will be held to the bottom rail by a layer 40 of cement as shown in Fig. 7. Interference on the part of the ears 31 with an adjacent frame will be prevented by the guides 11.

The particular form of connector 7 shown herein may be varied and in fact the head 30 can, if desired, be an integral part of the connector, but because of the high speed to which looms of the type to which the invention is applied operate it is desirable that some parts of the mechanism run in oil and it is for this reason that the connector 7 and the member 8 are made as described so that the connector 7 can extend down into an oil case 45 and the member 8 always be above the oil case. There may, however, be some seepage of oil up along the member 8 and the head 30, or the attendant may inadvertently lubricate the head 30, and for these reasons it is desirable that the body of rubber be made of synthetic soft elastic rubber-like material which is resistant to oil and will not be deteriorated by it.

The normal width of the slot 32 is ordinarily slightly less than the thickness of the head 30. The member 8 may in fact be made of a narrow strip of sheet metal which is bent as indicated to form the head 30 and by the arrangement shown a contact between the body of rubber and the head 30 extends more or less at right angles to the direction in which the harness frame will be moved by its cam so that there is a considerable area of contact between the head and the body of rubber to transmit the forces which produce the reciprocating motions of the harness frame. This advantage in the transmission reciprocating forces is present whether the harness frame is being lifted or being depressed. It will be noted from an inspection of Fig. 3 that the forces transmitted by connector 7 and driver 8 pass through a plane common to frame 12, rail 20 and projection 26. These forces create shear stresses between projection 26 and body 27, but because rail 20 supports projection 26 in a plane common to the point at which said forces are applied, these shear stresses are reduced to a minimum.

In the operation of the invention the shaft 2 will ordinarily operate at such a speed that there will be well over 1,000 shiftings of the harness frame per minute and there will also be a slight angular motion between the head 30 and the frame H in the direction of the plane of the harness frame. Because of the inherent resilience of the body of soft elastic material, however, the latter can adapt itself to the angular motion of the head. In this connection it should be noted that the part of the body of rubber through which the head passes is spaced from adjacent parts of both the rail 20 and the metallic plate 28 so that there is a considerable portion of the body which has no direct restraining contact with the rail and can respond to torsion or compression stresses without loosening the holding relation between the body of rubber and the rail.

From the foregoing it will be seen that the invention sets forth an improved operative connection between the driver 8 and the harness frame, this improved operative connection including a body of rubbery material which is fastened to the harness frame and the head 30. Such a connection has been found to operate satisfactorily without lubrication. It will also be seen that the ears 31 engage adjacent parts of the rubbery body to preserve proper relation between it and the head 30. Also, when plate 28 is used it serves as a guard to prevent engagement of the head 30 with an adjacent harness frame. The member 8 as shown in Fig. 2 is preferably on one side of the rail 20 and the head 30 extends through the rubber material so that its ears 31 are on the opposite side of the rail. It will also be seen that the elastic material can be compressed somewhat in the direction of reciprocation of the harness frame to serve somewhat as a shock absorber and can also twist slightly to accommodate the angular motion of the head due to the fact that the latter is connected to a lever. If oil or other lubricant should by mistake come in contact with the rubber material, the latter will not be damaged since it is made in such manner that it can resist deterioration under such conditions.

Having now particularly described and ascertained the nature of the invention and in what manner the same is to be performed, what is claimed is:

1. In a loom having a harness frame to be reciprocated, a cross rail forming part of the frame, a reciprocable driver to reciprocate the frame and having an angular motion parallel to said rail when the driver is reciprocated, and operative connections between the rail and driver including a body of soft elastic rubbery material secured to the rail and means on the driver extending through and having driving connection with said body to transmit force from the driver through said body to the frame, said body having a projection extending therefrom into said rail such that the latter supports said projection in a plane common to the point at which said force is applied.

2. The loom set forth in claim 1 wherein said body of rubbery material is flat on one side thereof and a metallic plate lying against said one side is held to the rail by means which pass through the plate and body and into the rail.

3. The loom set forth in claim 1 wherein said body of rubbery material is cemented to said rail.

4. The loom set forth in claim 1 wherein said body has a slot therein transverse of the direction of reciprocation of the driver and said means fits into said slot.

5. The loom set forth in claim 1 wherein said body has an elongated slot therein transverse of the direction of reciprocation of the driver and said means includes a head on the driver extending from one side of said body through the slot and projecting beyond the other side of said body, the part of the head extending beyond said body having a length measured in the direction of said slot greater than the length of the slot.

6. The loom set forth in claim 5 wherein a plate on said other side of the body is secured to said rail and has an opening therein to receive said projecting part of said head and guards the latter from engagement with an adjacent harness frame.

7. The loom set forth in claim 5 wherein the part of the head which extends beyond said body has oppositely extending ears thereon engaging said other side of said body and the distance from ear to ear is greater than the length of said slot.

8. The loom set forth in claim 4 wherein said rail is formed with an opening therein and said slot is in a projection on the body fitting into the opening and the slot terminates at its ends at points spaced from the adjacent parts of the rail.

9. The mechanism set forth in claim 4 wherein the means includes a flat head and the normal width of the slot is less than the thickness of the head to enable said body to maintain a tight fit with the head.

10. In a loom having a harness frame to be reciprocated, a cross rail on the bottom of the frame thereof, a reciprocable driver moving in a direction to reciprocate the frame and also angularly in a direction parallel to the plane of the frame, and operative connections between the rail and driver including a body of soft elastic rubbery material secured to said rail and having an elongated slot therethrough transverse of said direction to reciprocate and a head on the driver fitting into and held in said slot, part of said body tending to be compressed due to motion of said driver in said direction to reciprocate and tending to yield to torsional shear stresses resulting due to said angular motion of the driver.

References Cited in the file of this patent

UNITED STATES PATENTS 2,069,330  Rossmann _____ Feb. 2, 1937